(12) United States Patent
Wentink

(10) Patent No.: US 8,498,275 B2
(45) Date of Patent: Jul. 30, 2013

(54) DETERMINISTIC BACKOFF WITH DYNAMIC ADAPTATION

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 12/914,455

(22) Filed: Oct. 28, 2010

(65) Prior Publication Data

US 2011/0103352 A1  May 5, 2011

Related U.S. Application Data

(60) Provisional application No. 61/256,881, filed on Oct. 30, 2009.

(51) Int. Cl.
*H04J 3/00* (2006.01)

(52) U.S. Cl.
USPC .................................................. 370/336

(58) Field of Classification Search
None
See application file for complete search history.

(56) References Cited

U.S. PATENT DOCUMENTS

| 2006/0187952 A1* | 8/2006 | Kappes et al. | 370/445 |
| 2010/0150122 A1* | 6/2010 | Berger et al. | 370/338 |
| 2011/0007703 A1* | 1/2011 | He et al. | 370/329 |

OTHER PUBLICATIONS

Chun-Ting Chou, et al., "Contention-Based Airtime Usage Control in Multirate IEEE 802.11 Wireless LANs", IEEE / ACM Transactions on Networking, IEEE / ACM, New York, NY, US, vol. 14, No. 6, Dec. 1, 2006, pp. 1179-1192, XP011151885.
International Search Report—PCT/US2010/054693—International Search Authority, European Patent Office, Feb. 17, 2011.
Siwamogsatham S et al., "On Backoff Timer Scheduling for Smart-DCF and Performance Evaluation", Advanced Information Networking and Applications—Workshops, 2008. AINAW 2008. 22nd International Conference on, IEEE, Piscataway, NJ, USA, Mar. 25, 2008, pp. 1278-1284, XP031240991.
Siwaruk Siwamogsatham, et al., "A Novel Smart-DCF Scheme for High-Speed WLANs", Communications and Information Technologies, 2007. ISCIT '07, International Symposium on, IEEE, P1, Oct. 1, 2007, pp. 1032-1037, XP031166613.
Written Opinion—PCT/US2010/054693—ISA/EPO—Feb. 17, 2011.

* cited by examiner

*Primary Examiner* — John Blanton
(74) *Attorney, Agent, or Firm* — Kevin T. Cheatham

(57) ABSTRACT

Certain aspects provide techniques for conveying transmit opportunity (TXOP) scheduling information that can be used by a plurality of wireless nodes to determine TXOPs for sending transmissions.

28 Claims, 11 Drawing Sheets

| | STA0 countdown | STA0 backoff | STA1 countdown | STA1 backoff | STA2 countdown | STA2 backoff | STA3 countdown | STA3 backoff |
|---|---|---|---|---|---|---|---|---|
| AIFS | | 0 | | 6 | | 17 | | 33 |
| BO | 0 | 0 | | 6 | | 17 | | 33 |
| RTS | | RTS | | 6 | | 17 | | 33 |
| CTS | | CTS | | 6 | | 17 | | 33 |
| TXOP | | TXOP | | 6 | | 17 | | 33 |
| AIFS | | | | 6 | | 17 | | 33 |
| BO | | | 6 | 0 | 6 | 11 | 6 | 27 |
| RTS | | | | RTS | | 11 | | 27 |
| CTS | | | | CTS | | 11 | | 27 |
| TXOP | | | | TXOP | | 11 | | 27 |
| AIFS | | | | | | 11 | | 27 |
| BO | | | | | 11 | 0 | 11 | 16 |
| RTS | | | | | | RTS | | 16 |
| CTS | | | | | | CTS | | 16 |
| TXOP | | | | | | TXOP | | 16 |
| AIFS | | | | | | | | 16 |
| BO | | | | | | | 16 | 0 |
| RTS | | | | | | | | RTS |
| CTS | | | | | | | | CTS |
| TXOP | | | | | | | | TXOP |

FIG. 11

|  | STA0 countdown | STA0 backoff | STA1 countdown | STA1 backoff | STA2 countdown | STA2 backoff | STA3 countdown | STA3 backoff |
|---|---|---|---|---|---|---|---|---|
| AIFS |  | 0 |  | 6 |  | 17 |  | 33 |
| BO | 0 | 0 |  | 6 |  | 17 |  | 33 |
| RTS |  | RTS |  | 6 |  | 17 |  | 33 |
| CTS |  | CTS | 5 | 1 | 0 | 12 |  | 28 |
| TXOP |  | TXOP |  | 1 | 5 | 12 |  | 28 |
| AIFS |  |  |  | 1 |  | 12 |  | 28 |
| BO |  |  | 1 | 0 |  | 11 |  | 27 |
| RTS |  |  |  | RTS |  | 11 |  | 27 |
| CTS |  |  |  | CTS |  | 11 |  | 27 |
| TXOP |  |  |  | TXOP |  | 11 |  | 27 |
| AIFS |  |  |  |  |  | 11 |  | 27 |
| BO |  |  |  |  | 11 | 0 |  | 16 |
| RTS |  |  |  |  |  | RTS |  | 16 |
| CTS |  |  |  |  |  | CTS |  | 16 |
| TXOP |  |  |  |  |  | TXOP |  | 16 |
| AIFS |  |  |  |  |  |  |  | 16 |
| BO |  |  |  |  |  |  | 16 | 0 |
| RTS |  |  |  |  |  |  |  | RTS |
| CTS |  |  |  |  |  |  |  | CTS |
| TXOP |  |  |  |  |  |  |  | TXOP |

FIG. 12

| | STA0 countdown | STA0 backoff | STA1 countdown | STA1 backoff | STA2 countdown | STA2 backoff | STA3 countdown | STA3 backoff |
|---|---|---|---|---|---|---|---|---|
| AIFS | | 0 | | 6 | | 17 | | 33 |
| BO | 0 | 0 | | 6 | | 17 | | 33 |
| RTS | | RTS | 0 | 6 | 0 | 17 | 0 | 33 |
| CTS | | CTS | | 6 | | 17 | | 33 |
| TXOP | | TXOP | | 6 | | 17 | | 33 |
| AIFS | | | | 6 | | 17 | | 33 |
| BO | | | 6 | 0 | 6 | 11 | 6 | 27 |
| RTS | | | | RTS | 5 | 6 | | 27 |
| CTS | | | | CTS | | 6 | | 27 |
| TXOP | | | | TXOP | | 6 | | 27 |
| AIFS | | | | | | 6 | | 27 |
| BO | | | | | 6 | 0 | 6 | 21 |
| RTS | | | | | | RTS | | 21 |
| CTS | | | | | | CTS | | 21 |
| TXOP | | | | | | TXOP | | 21 |
| AIFS | | | | | | | | 21 |
| BO | | | | | | | 21 | 0 |
| RTS | | | | | | | | RTS |
| CTS | | | | | | | | CTS |
| TXOP | | | | | | | | TXOP |

FIG. 13

| | STA0 countdown | STA0 backoff | STA1 countdown | STA1 backoff | STA2 countdown | STA2 backoff | STA3 countdown | STA3 backoff |
|---|---|---|---|---|---|---|---|---|
| AIFS | | 0 | | 6 | | 17 | | 33 |
| BO | 0 | 0 | | 6 | | 17 | | 33 |
| RTS | | RTS | | 6 | | 17 | | 33 |
| CTS | | CTS | | 6 | | 17 | | 28 |
| TXOP | | TXOP | | 6 | | 17 | | 28 |
| AIFS | | | | 6 | | 17 | | 28 |
| BO | | | 6 | 0 | 6 | 11 | | 22 |
| RTS | | | | RTS | | 11 | | 17 |
| CTS | | | | CTS | | 11 | | 17 |
| TXOP | | | | TXOP | | 11 | | 17 |
| AIFS | | | | | | 11 | | 17 |
| BO | | | | | 11 | 0 | 11 | 6 |
| RTS | | | | | | RTS | 5 | 1 |
| CTS | | | | | | CTS | | 1 |
| TXOP | | | | | | TXOP | | 1 |
| AIFS | | | | | | | | 1 |
| BO | | | | | | | 1 | 0 |
| RTS | | | | | | | | RTS |
| CTS | | | | | | | | CTS |
| TXOP | | | | | | | | TXOP |

FIG. 14

DETERMINISTIC BACKOFF WITH DYNAMIC ADAPTATION

CLAIM OF PRIORITY UNDER 35 U.S.C. §119

The present Application for Patent claims benefit of Provisional Application Ser. No. 61/256,881 filed Oct. 30, 2009 and assigned to the assignee hereof and hereby expressly incorporated by reference herein.

FIELD

Certain aspects of the present disclosure generally relate to wireless communications and, more particularly, to transmitting data to a plurality of wireless stations.

BACKGROUND

In order to address the issue of increasing bandwidth requirements demanded for wireless communication systems, different schemes are being developed to allow multiple user terminals to communicate with a single base station by sharing the same channel (same time and frequency resources) while achieving high data throughputs. Spatial Division Multiple Access (SDMA) represents one such approach that has recently emerged as a popular technique for the next generation communication systems.

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of multiple space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S \leq \min\{N_T, N_R\}$. The $N_S$ spatial streams may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes less than the number of access point antennas for data transmission and reception. When SDMA is transmitted from an access point, $N_S=\min\{N_T, \text{sum}(N_R)\}$, where sum($N_R$) represents the summation of all user terminal receive antennas. When SDMA is transmitted to an access point, $N_S=\min\{\text{sum}(N_T), N_R\}$, where sum($N_T$) represents the summation of all user terminal transmit antennas.

SUMMARY

Certain aspects provide a method for wireless communications. The method generally includes receiving, on a contention access (CA) channel, one or more downlink transmissions containing transmit opportunity (TXOP) scheduling information that can be used by a plurality of wireless nodes to determine TXOPs for sending transmissions, determining a TXOP based, at least in part, on the scheduling information and one or more monitored clear channel assessment (CCA) busy events, and sending a transmission during the determined TXOP.

Certain aspects of the present disclosure provide an apparatus for wireless communications. The apparatus generally includes a receiver configured to receive, on a contention access (CA) channel, one or more transmissions containing transmit opportunity (TXOP) scheduling information that can be used by a plurality of wireless nodes including the apparatus to determine TXOPs for sending transmissions and a scheduler configured to determine a TXOP based, at least in part, on the scheduling information and one or more monitored clear channel assessment (CCA) busy events and a transmitter configured to send a transmission during the determined TXOP.

Certain aspects of the present disclosure provide an apparatus for wireless communications. The apparatus generally includes means for receiving, on a contention access (CA) channel, one or more transmissions containing transmit opportunity (TXOP) scheduling information that can be used by a plurality of wireless nodes including the apparatus to determine TXOPs for sending transmissions, means for determining a TXOP based, at least in part, on the scheduling information and one or more monitored clear channel assessment (CCA) busy events, and means for sending a transmission during the determined TXOP.

Certain aspects of the present disclosure provide a computer-program product for wireless communications, comprising a computer-readable medium comprising instructions. The instructions are generally executable by an apparatus to receive, on a contention access (CA) channel, one or more transmissions containing transmit opportunity (TXOP) scheduling information that can be used by a plurality of wireless nodes to determine TXOPs for sending transmissions, determine a TXOP based, at least in part, on the scheduling information and one or more monitored clear channel assessment (CCA) busy events, and send a transmission during the determined TXOP.

Certain aspects of the present disclosure provide a wireless station. The wireless station generally includes at least one antenna, a receiver configured to receive, via the at least one antenna, on a contention access (CA) channel, one or more transmissions containing transmit opportunity (TXOP) scheduling information that can be used by a plurality of wireless nodes including the wireless station to determine TXOPs for sending transmissions, a scheduler configured to determine a TXOP based, at least in part, on the scheduling information and one or more monitored clear channel assessment (CCA) busy events, and a transmitter configured to send, via the at least one antenna, a transmission during the determined TXOP.

Certain embodiments provide a method for wireless communications. The method generally includes transmitting, on a contention access (CA) channel, one or more transmissions containing transmit opportunity (TXOP) scheduling information that can be used by a plurality of wireless nodes to determine TXOPs for sending transmissions and receiving transmissions from the wireless nodes during TXOPs determined, at least in part, on the scheduling information and one or more monitored clear channel assessment (CCA) busy events.

Certain aspects of the present disclosure provide an apparatus for wireless communications. The apparatus generally includes a transmitter configured to transmit, on a contention access (CA) channel, one or more transmissions containing transmit opportunity (TXOP) scheduling information a plurality of wireless nodes can use to determine TXOPs for sending transmissions and a receiver configured to receive transmissions from the wireless nodes during TXOPs determined, at least in part, based on the scheduling information and one or more monitored clear channel assessment (CCA) busy events.

Certain aspects of the present disclosure provide an apparatus for wireless communications. The apparatus generally includes means for transmitting, on a contention access (CA) channel, one or more transmissions containing transmit opportunity (TXOP) scheduling information that can be used by a plurality of wireless nodes to determine TXOPs for sending transmissions and means for receiving transmissions from the wireless nodes during TXOPs determined, at least in part, based on the scheduling information and one or more monitored clear channel assessment (CCA) busy events.

Certain aspects of the present disclosure provide a computer-program product for wireless communications, comprising a computer-readable medium comprising instructions. The instructions are generally executable by an apparatus to transmit, on a contention access (CA) channel, one or more transmissions containing transmit opportunity (TXOP) scheduling information that can be used by a plurality of wireless nodes to determine TXOPs for sending transmissions and receive transmissions from the wireless nodes during TXOPs determined, at least in part, based on the scheduling information and one or more monitored clear channel assessment (CCA) busy events.

Certain aspects of the present disclosure provide an access point. The access point generally includes at least one antenna, a transmitter configured to transmit via the at least one antenna, on a contention access (CA) channel, one or more transmissions containing transmit opportunity (TXOP) scheduling information that can be used by a plurality of wireless nodes to determine TXOPs for sending transmissions, and a receiver configured to receive, via the at least one antenna, transmissions from the wireless nodes during TXOPs determined, at least in part, based on the scheduling information and one or more monitored clear channel assessment (CCA) busy events.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 11-14 illustrate example backoff countdown scenarios for four example nodes.

DETAILED DESCRIPTION

The word "exemplary" is used herein to mean "serving as an example, instance, or illustration." Any embodiment described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

Certain aspects of the present disclosure provide techniques and apparatus that may be utilized schedule parallel transmissions, for example, as Spatial-Division Multiple Access (SDMA) transmit opportunities (TXOPs).

An Example Wireless Communication System

The word "exemplary" is used herein to mean "serving as an example, instance, or illustration." Any embodiment described herein as "exemplary" is not necessarily to be construed as preferred or advantageous over other aspects.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) subbands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

Figure 1:
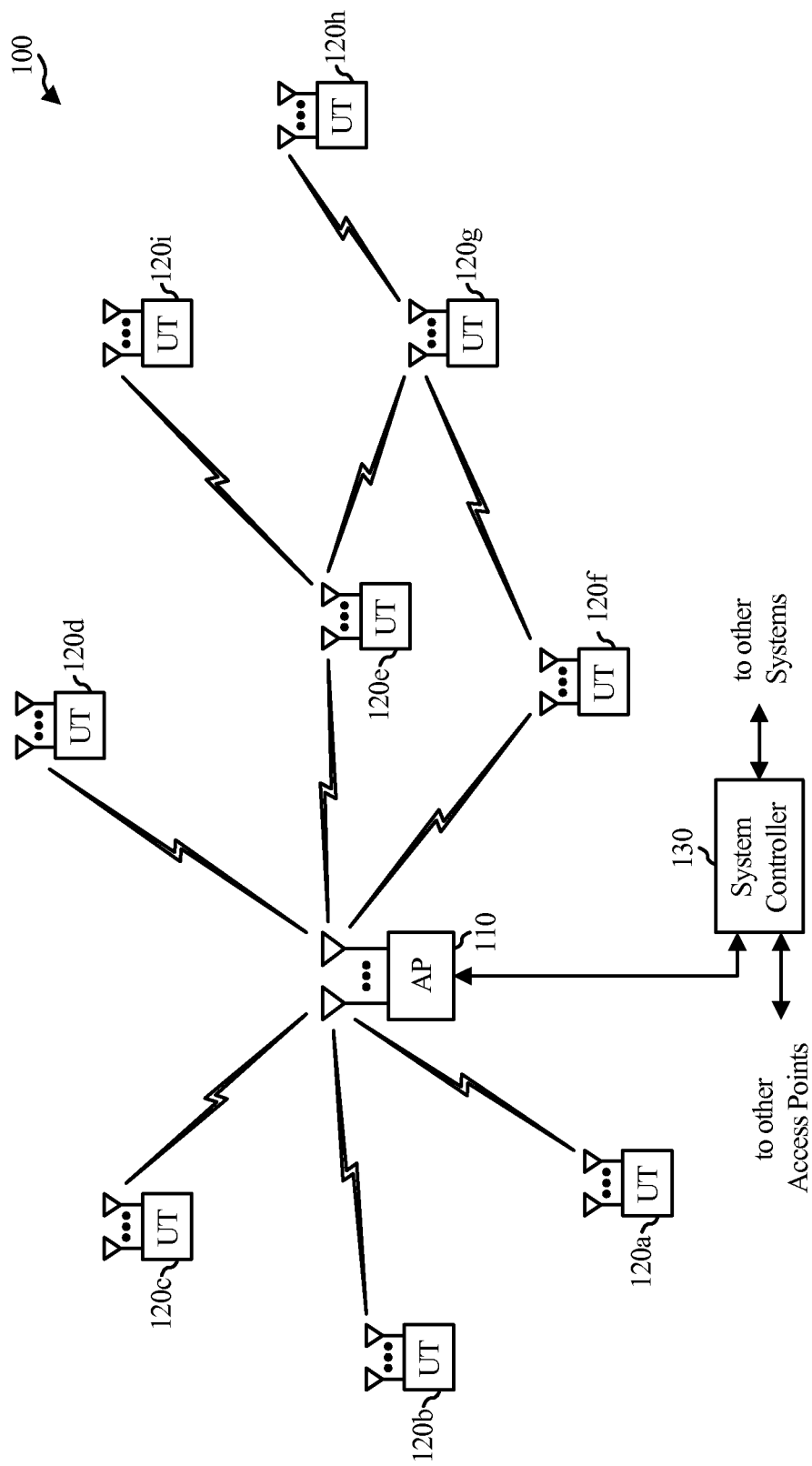
FIG. 1 illustrates a wireless system in accordance with certain aspects of the present disclosure.

FIG. 1 shows an example multiple-access MIMO system 100 with access points and user terminals. For simplicity, only one access point 110 is shown in FIG. 1. An access point is generally a fixed station that communicates with the user terminals and may also be referred to as a base station or some other terminology. A user terminal (UT) may be fixed or mobile and may also be referred to as a mobile station, a wireless device, simply a "station" (STA), user equipment (UE), mobile station (MS) or some other terminology. Access point 110 may communicate with one or more user terminals 120 at any given moment on the downlink and uplink. The downlink (i.e., forward link) is the communication link from the access point (AP) to the user terminals, and the uplink (i.e., reverse link) is the communication link from the user terminals to the access point. A user terminal (UT) may also communicate peer-to-peer with another UT. A system controller 130 couples to and provides coordination and control for the access points.

While portions of the following disclosure will describe user terminals 120 capable of communicating via SDMA, for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of $N_u$ selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or a different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each user terminal may be equipped with a single antenna (e.g., in order to keep costs down) or multiple antennas (e.g., where the additional cost can be supported).

Figure 2:
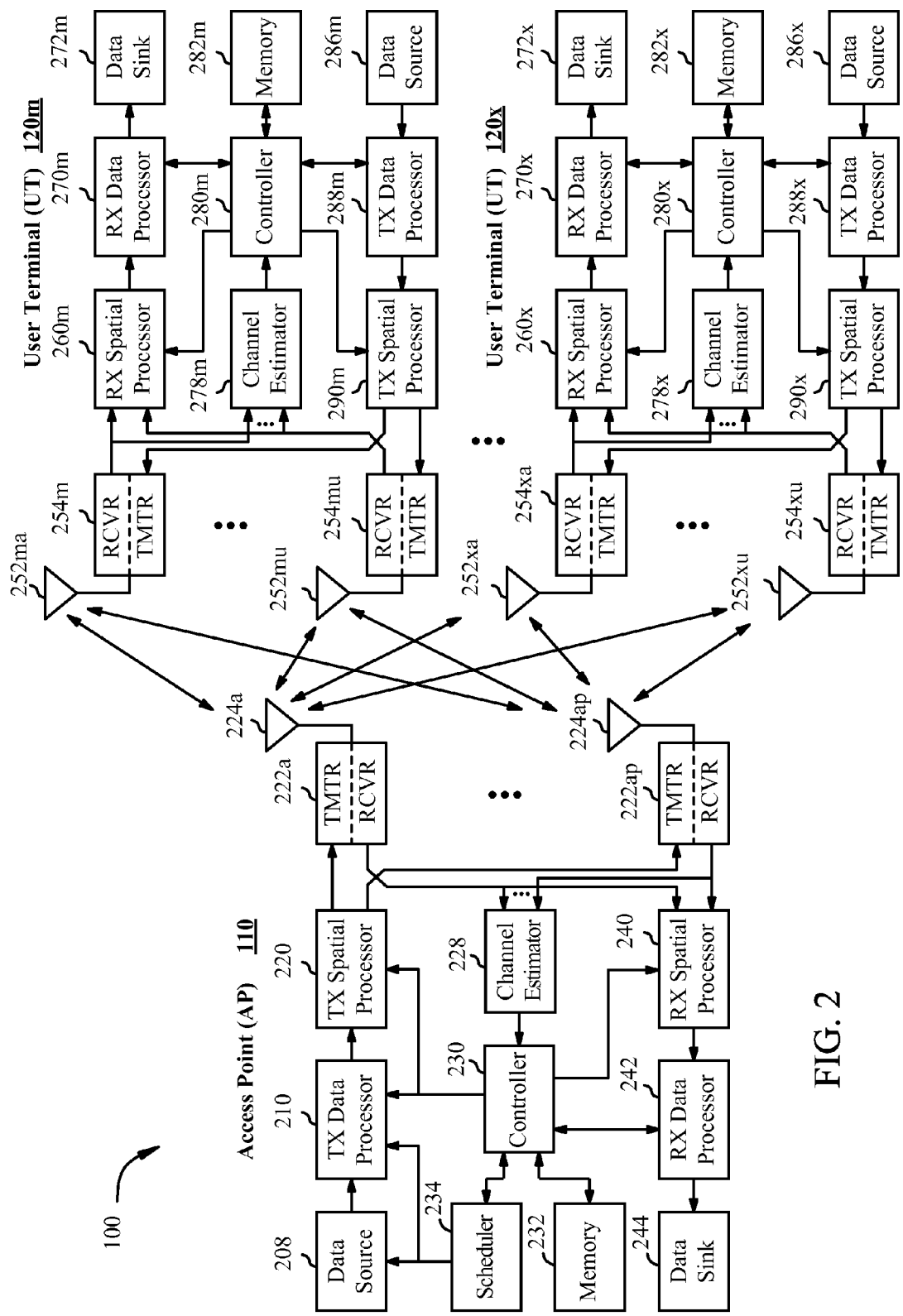
FIG. 2 illustrates a block diagram of an access point and two user terminals in accordance with certain aspects of the present disclosure.

FIG. 2 shows a block diagram of access point 110 and two user terminals 120m and 120x in system 100. Access point 110 is equipped with antennas 224a through 224t. User terminal 120m is equipped with antennas 252ma through 252mu, and user terminal 120x is equipped with antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink (i.e., $N_{up}$ user terminals may transmit to the AP simultaneously on the uplink via SDMA), $N_{dn}$ user terminals are selected for simultaneous transmission on the downlink (i.e., the AP may transmit to $N_{dn}$ user terminals simultaneously on the downlink via SDMA), $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides transmit symbol streams for the antennas. Each transmitter unit (TMTR illustratively shown in a receiver/transmitter 254) receives and processes (e.g., converts to analog, amplifies, filters, and frequency upconverts) a respective transmit symbol stream to generate an uplink signal. Transmitter units provide uplink signals for transmission from antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, antennas 224a through 224ap receive the uplink signals from all $N_{up}$ user terminals transmitting on the uplink. Each antenna 224 provides a received signal to a respective receiver unit (RCVR illustratively shown in a receiver/transmitter 222). Each receiver unit performs processing complementary to that performed by a transmitter unit in a UT 120 and provides a received symbol stream. An RX spatial processor 240 performs receiver spatial processing on the received symbol streams from receiver units and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides transmit symbol streams for the antennas. Each transmitter unit (TMTR illustratively shown in receiver/transmitter 222) receives and processes a respective transmit symbol stream to generate a downlink signal, transmitter units providing downlink signals for transmission from antennas 224 to the user terminals.

At each user terminal 120, antennas 252 receive the downlink signals from access point 110. Each receiver unit (RCVR illustratively shown in receiver/transmitter 254) processes a received signal from an associated antenna 252 and provides a received symbol stream. An RX spatial processor 260 performs receiver spatial processing on received symbol streams from receiver units and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal, where the subscript m refers to the "$m^{th}$" user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
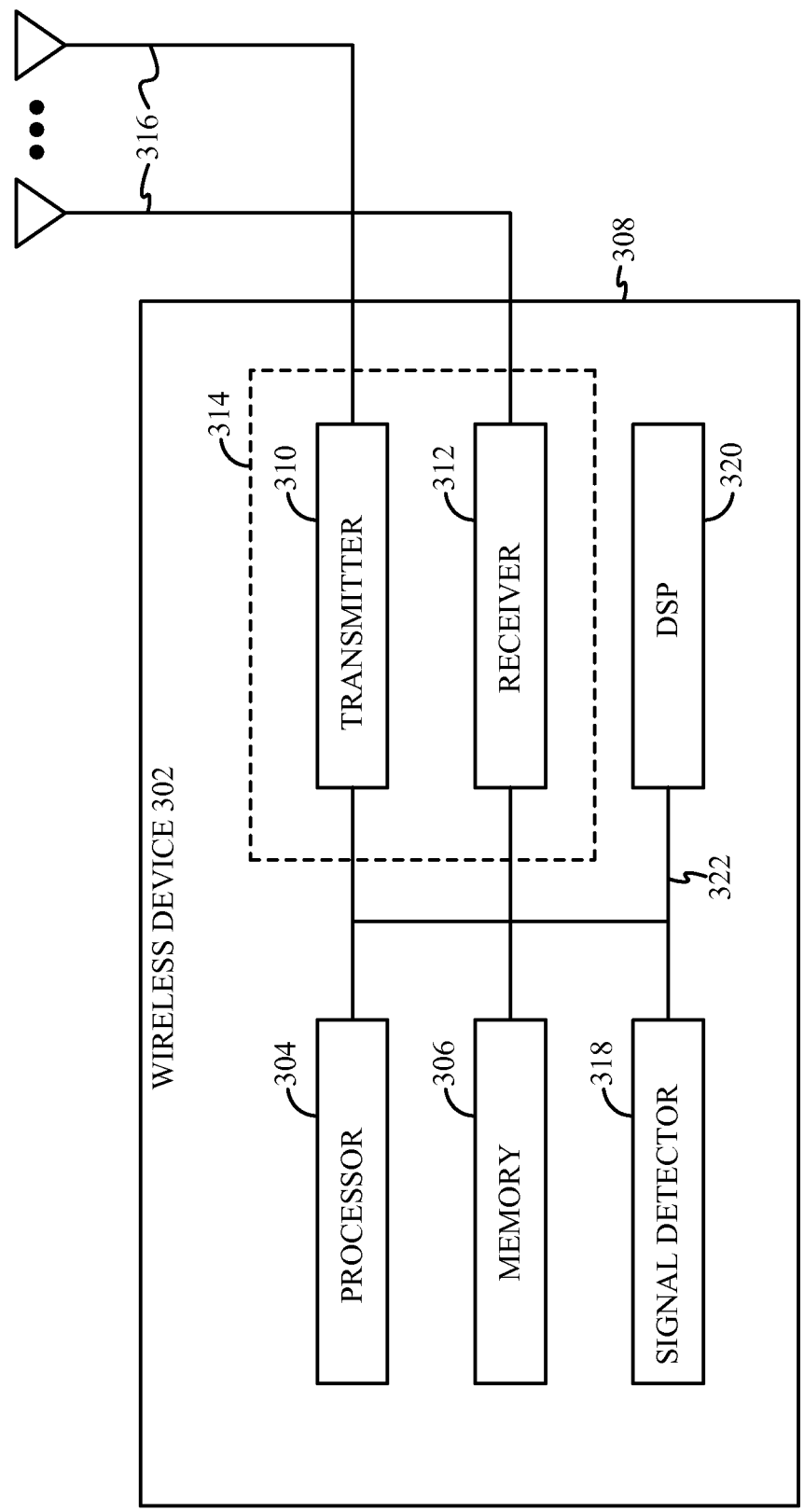
FIG. 3 illustrates various components that may be utilized in a wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be any type of wireless node, such as an access point (AP) or station (user terminal).

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

Deterministic Backoff

One challenge in multi-user systems, such as an 802.11 Wireless LAN (WLAN), is how to efficiently organize response transmit opportunities (TXOPs) from several receivers. The receivers may have received downlink data in parallel through a Spatial Division Multiple Access (SDMA) transmission from the Access Point (AP), after which they may need to respond with some type of acknowledgement, such as a Block Acknowledgement (BA) frame. According to certain aspects, BAs may be combined or "piggybacked" with uplink data traffic in a TXOP or multi-protocol data unit (MPDU).

One potential technique to address this challenge is to provide the addressed receivers with a scheduled wait period (which may be referred to as a "deterministic backoff") that each receiver uses to determine timing for its response TXOP. For example, by including a deterministic slot count (DSC) field in downlink transmissions, each of a plurality of STAs may determine a TXOP that does not overlap with TXOPs of other stations.

Figures 4, 5:
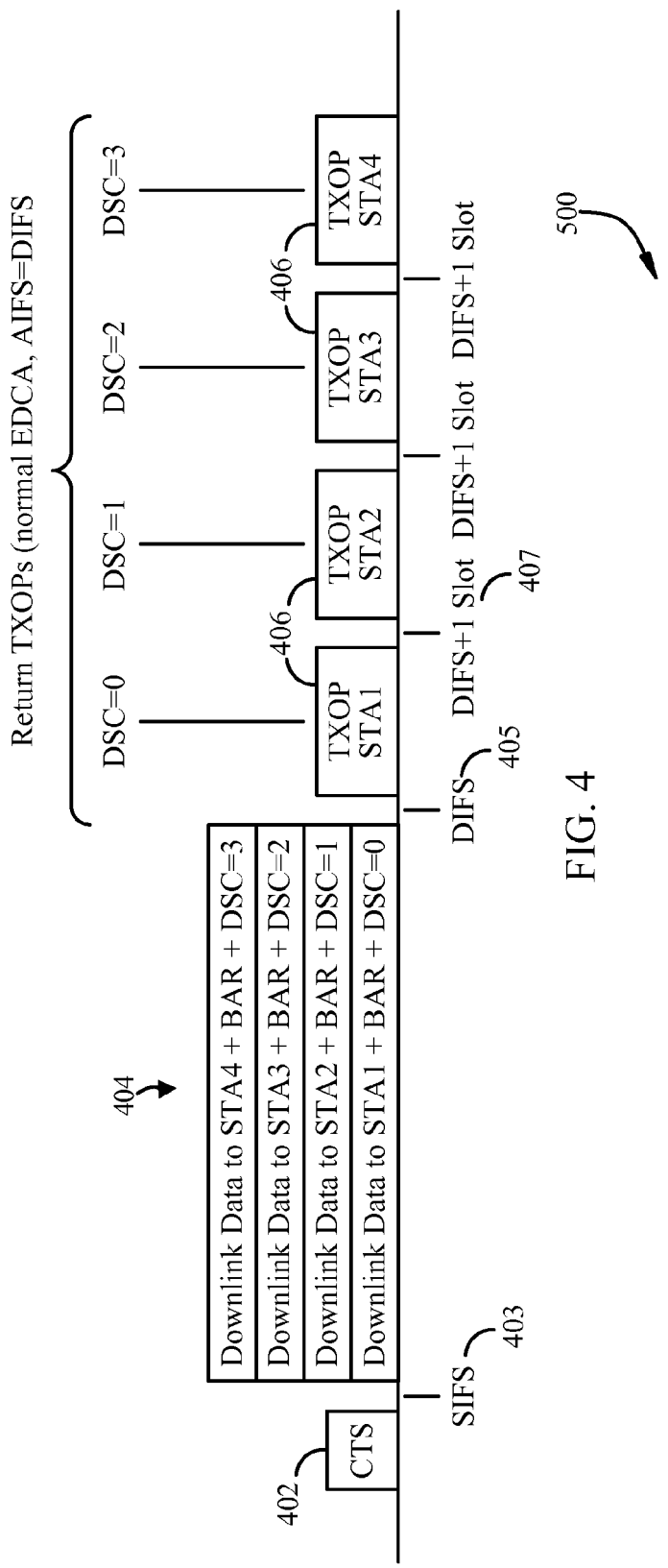
FIG. 4 illustrates an example exchange of message frames, in accordance with certain aspects of the present disclosure.
FIG. 5 illustrates example backoff values for a plurality of nodes in accordance with certain aspects of the present disclosure.

As illustrated in FIG. 4, such a deterministic slot count may indicate a relative time period after a downlink transmission that precedes a response TXOP by the STA. Indicating a deterministic slot count may thus enable each station to determine a response TXOP that avoids collision with response TXOPs of other stations. The response TXOP may be used by the station to transmit control, management and/or data frames, in the uplink direction or on a direct link.

In the example illustrated in FIG. 4, it may be assumed that Enhanced Distributed Channel Access (EDCA) is used with an Arbitration Interframe Space (AIFS) equal to a DIFS period 405. Following a clear to send (CTS) 402, after a SIFS period 403, an AP may send a downlink transmission 404 with downlink data to multiple stations (e.g., STA1-STA4 in the illustrated example). As illustrated, a DSC may be sent with the DL data for each station, as well as a block acknowledgement request (BAR).

The DSC received by each station may determine the timing of the TXOP 406 from each station. As illustrated, STA1, which received a DSC of 0, may access the medium a DIFS period after the end of the downlink transmission 404 containing the DSC.

STA2, which received a DSC of 1, may access the medium DIFS+1 slot after the end of the TXOP started by STA1. STA3, which received a DSC of 2, may access the medium a period 407 (with a duration equal to DIFS+1 slot) after the TXOP started by STA2. STA4, which received a DSC of 3, may access the medium DIFS+1 slot after the TXOP started by STA3. The difference in gap size between the first and subsequent TXOPs may be caused by the fact that AIFS may not be counted as a backoff slot in regular EDCA. As a result, only a backoff of zero slots (for STA1) may result in a DIFS gap (or AIFS in general), while non-zero backoff may result in a gap of at least DIFS+1 slot (or AIFS+1 slot in general).

Different examples of deterministic backoff channel access may be envisioned. In general, the effective use of deterministic backoff may rely on the ability of each STA to "hear" transmissions from the other STAs. This may be necessary in order to synchronize the backoff countdown amongst the nodes. However, when a pair of nodes exist in a basic service set (BSS) that do not hear each others transmissions (so called "hidden nodes"), then a backoff countdown may occur at these nodes when it should not, potentially causing a collision.

One possible solution for the hidden node problem is the use of larger backoff values in combination with a mandatory RTS/CTS-exchange with the AP prior to each response TXOP. In other words, since the AP should be heard by all STAs, the STAs may synchronize their backoff timers with the RTS sent by the AP. While a relatively straightforward and simple solution, a potential drawback of this solution is that the backoff periods may become longer than necessary in the absence of hidden nodes.

Dynamically Adjusted Deterministic Backoff

According to certain aspects, the issue of potentially unnecessarily large backoff times may be addressed by dynamically recalculating the backoff value at each of the nodes participating in the response TXOPs during a CCA busy event. A CCA busy event generally refers to any event during which the PHY indicates that the medium is busy and/or during which the network allocation vector (NAV) is set. In cases when the NAV is used to protect the response TXOP, the end of a CCA busy event may be aligned for all nodes in the BSS. However, the start of the response TXOPs may differ between stations, depending on whether a preceding RTS is detectable ("visible") to a node or not.

According to certain aspects, the backoff at each node may be dynamically adjusted according to a predetermined algorithm. The actual adjustment made at each node may depend on its node index. As an example, at the c-th CCA busy event after the downlink transmission(s) containing the DSCs for each STA, the backoff value, bo(i), at node i may be recalculated as follows:

$$bo(i)=(i-cca)*(rts+1), \text{for } i<c$$

$$bo(i)=0, \text{for } i=cca$$

wherein i is the node index corresponding to the order of the response TXOP (e.g., 0, 1, 2, etc.), cca is the index of the CCA busy event after receiving the DSC (0, 1, 2, etc.), and its is the length in slots of the RTS+SIFS (e.g., rounded up to next integer). The initial backoff (cca=0) may also be calculated according to this formula, which implies that the AP may send to the STAs their node index i, instead of a DSC.

Dynamically adjusted backoff values for an example scenario with 4 nodes and rts=5 slots are illustrated in the table shown in FIG. 5. As illustrated, for cca=0, nodes 0, 1, 2, and 3, will have backoff values of 0, 6, 12, and 18, respectively. For each subsequent cca, these values will shift down to the other nodes. For example, for cca=1, nodes 1, 2, and 3, will have backoff values of 0, 6, and 12, respectively. For cca=2, nodes 2 and 3, will have backoff values of 0 and 6, respectively. Finally, for cca=3, node 3 will have a backoff values of 0.

Rather than adjust the backoff values dynamically, according to certain aspects, the nodes may simply count the number of CCA busy events and set their backoff to 0 when their turn has arrived. This technique may be viewed as a simplified version of the dynamic technique for adjusting described above. However, this simplified version might fail if one of the nodes did not receive the DSC and, therefore, does not start a TXOP. The absence of an expected TXOP from the STA that did not receive a DSC may halt the TXOP process in other STAs, because the other STAs might think their turn never came. A backoff value may help ensure that following nodes will indeed transmit, even in the absence of the expected preceding transmission. According to certain aspects, the backoff value may be selected to be large enough for a hidden RTS transmission to occur prior to a TXOP.

Figure 6:
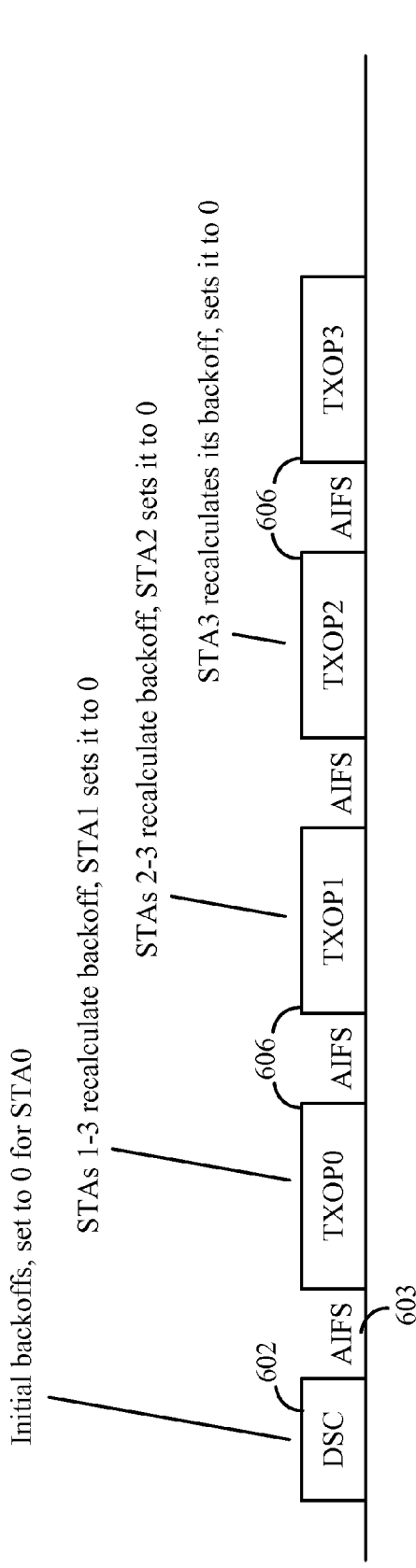
FIGS. 6 and 7 illustrate example exchanges of message frames, in accordance with certain aspects of the present disclosure.
Figure 7:
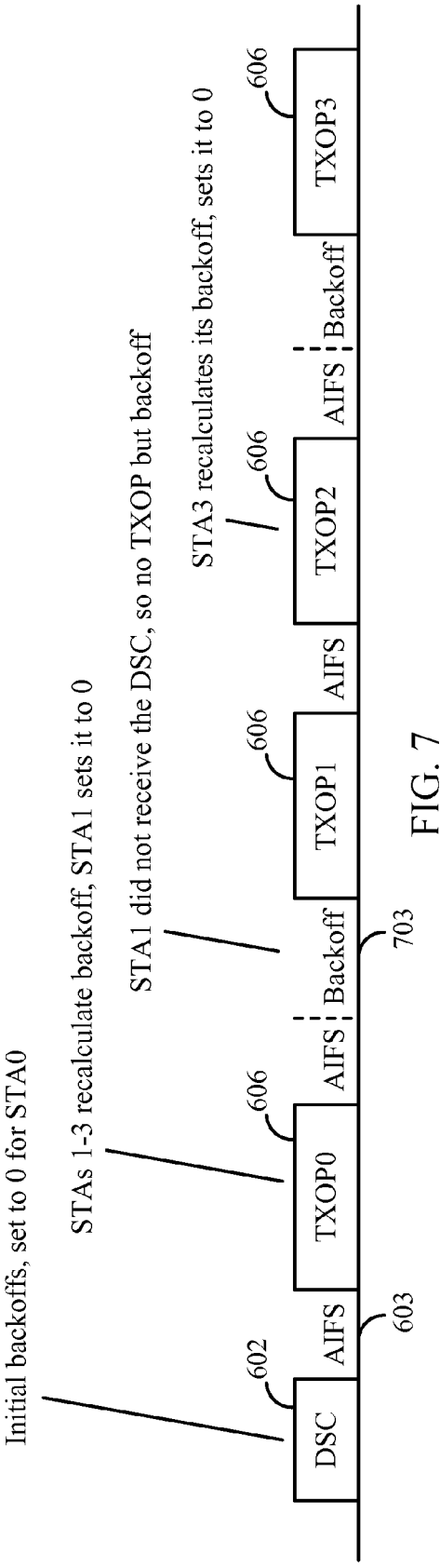

The use of this dynamic adaptation, based on a backoff value in the event an expected TXOP is not detected, is illustrated in FIGS. 6 and 7.

As illustrated in FIG. 6, after receiving DSCs in frame 602, the TXOPs 606 are separated by AIFS 603, because the next STA sets its backoff to 0 during the preceding TXOP 606. In this example, each STA received a DSC and transmits its expected TXOP after resetting its backoff to 0 (upon detecting an earlier expected TXOP).

As illustrated in FIG. 7, in the event an expected TXOP is not detected (e.g., in the event a STA did not receive a DSC), then the backoff mechanism ensures that the subsequent TXOPs still occur, albeit after a backoff period 703. In the illustrated example, STA1 and STA3 did not receive a DSC, but they still transmits a TXOP after backing off, allowing the TXOP process for the other stations to continue. As described above, the backoff between each of the subsequent TXOPs may be equal rts+1 slot, to account for possible hidden RTS transmissions.

Figure 8:
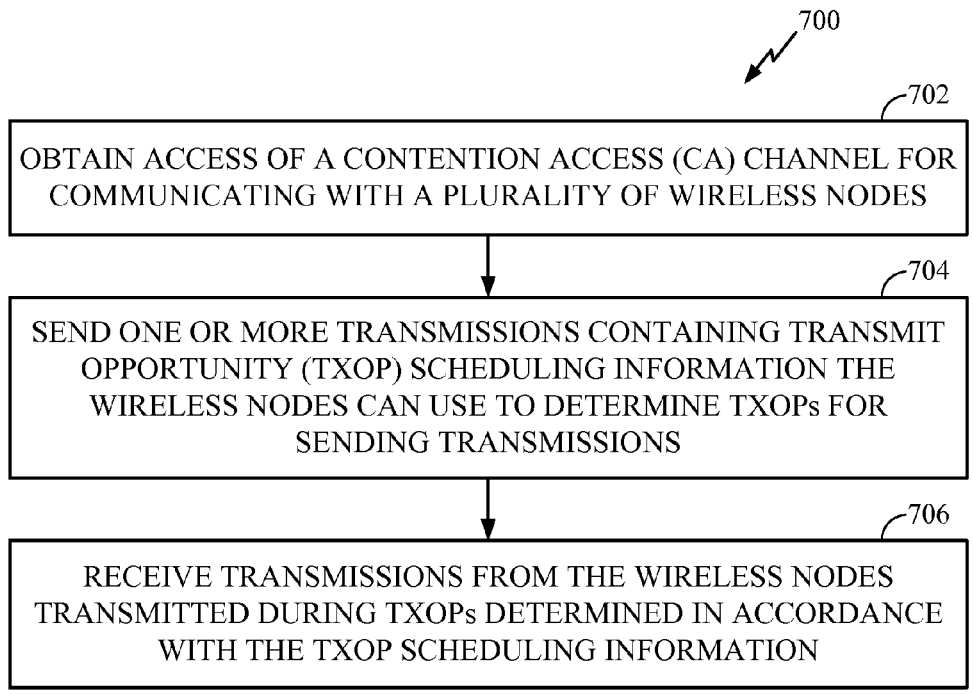
FIG. 8 illustrates example operations that may be performed by an AP.

FIG. 8 illustrates example operations 700 that may be performed, for example by an AP, to perform wireless communications in accordance with the techniques described above.

At 702, the AP obtains access of a contention access channel for communicating with a plurality of wireless nodes. At 704, the AP sends one or more transmissions containing TXOP scheduling information the wireless nodes can use to determine TXOPs for sending transmissions. At 706, the AP receives transmissions from the wireless nodes transmitted during TXOPs determined in accordance with the TXOP scheduling information.

An AP performing the operations 700 may be as described in connection with any of FIGS. 1-3. For instance, a controller 230 of AP 110 in FIG. 2 may perform operations 800, possibly in coordination with TX data processor 210 (e.g., that might transmit scheduling information with TXOPs) and RX data processor 242 (e.g., that might receive data sent during one or more of the TXOPs). Similarly, the operations 800 may also be performed by processor 304 and/or DSP 320 of FIG. 3, possibly in coordination with transmitter 310 and receiver 312.

Figure 9:
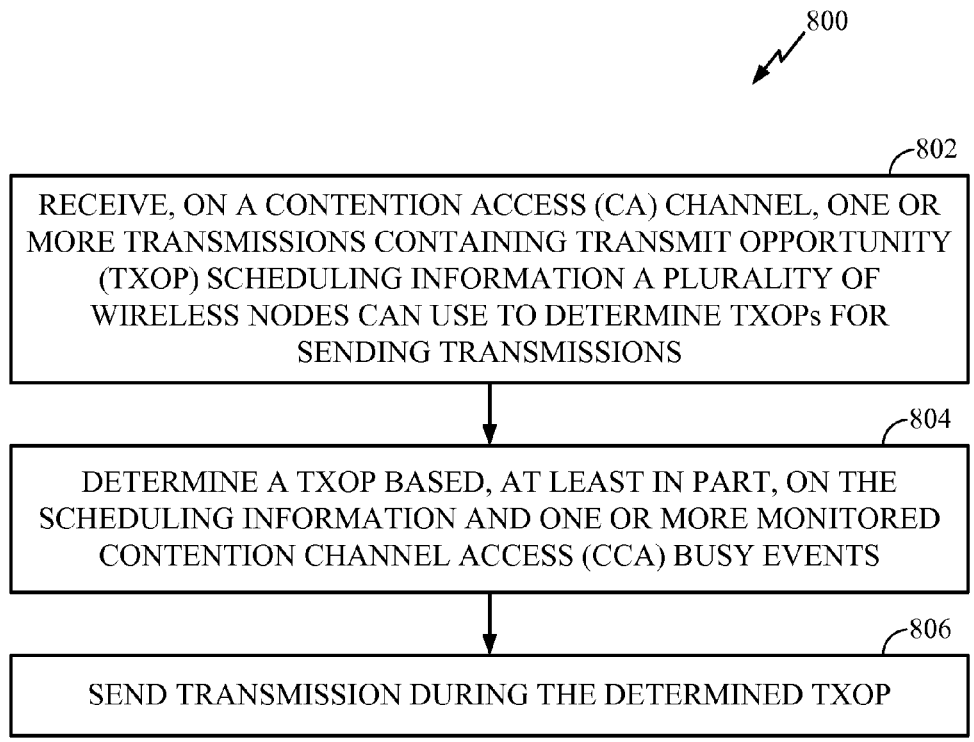
FIG. 9 illustrates example operations that may be performed by a STA.

FIG. 9 illustrates example operations 800 that may be performed by a wireless node (e.g., a STA) to perform wireless communications in accordance with the techniques described above.

At 802, the wireless node receives, on a CA channel, one or more transmissions containing TXOP scheduling information a plurality of wireless nodes can use to determine TXOPs for sending transmissions. At 804, the wireless node determines a TXOP based, at least in part, on the scheduling information and one or more monitored CCA busy events. At 806, the wireless node sends a transmission during the determined TXOP.

A UT (or STA) performing the operations 800 may be as described in connection with any UT of FIGS. 1-3. For instance, a controller 280 of a UT 110 in FIG. 2 may perform operations 800, possibly in coordination with RX data processor 270 (e.g., that might receive and extract scheduling information with TXOPs) and TX data processor 288 (e.g., that might transmit during one or more of the TXOPs). Similarly, the operations 800 may also be performed by processor 304 and/or DSP 320 of FIG. 3, possibly in coordination with receiver 312 and transmitter 310.

Deterministic Backoff with Hidden Node Protection

As described above, in certain scenarios, certain stations may not be able to hear transmissions from each other. When a pair of such hidden nodes exist in a BSS that do not hear their respective transmission, then a backoff countdown may occur at these nodes when it should not, which may result in a collision.

According to certain aspects of the present disclosure, the potential for collisions due to hidden nodes may be addressed by mandating that response TXOPs begin with an RTS transmitted to the AP. This RTS, which may set a NAV for the duration of the pending response TXOP, may be used in combination with a longer backoff timer value at each of the nodes. As a measure of safety, the longer backoff timer value may be set such that the backoff timer expires after a hidden RTS plus a SIFS period. Thus, the backoff timer may still be counted down during a hidden RTS transmission (because the station counting down does not detect the RTS transmission), until the AP responds with the CTS. The CTS from the AP should be visible even for the hidden node, assuming the hidden node is to be associated with the AP.

As noted above, the size of the deterministic backoff value may need to be such that the hidden node may count down backoff during each of the preceding RTS+SIFS periods (as it may not detect the RTS transmissions). The size of the deterministic backoff value may also need to be larger than the deterministic backoff value of the preceding node, because the preceding node may not be a hidden node and, therefore, may count down its backoff outside of the RTS+SIFS periods. Thus, setting the backoff timer values in this manner may be done in accordance with the following rules for setting a deterministic backoff that might be considered "hidden node proof." The backoff timer values may be calculated according to the following equations:

$dsc(0)=0$ $dsc(i)=dsc(i-1)+i*rts+1 \quad i>0$ wherein $dsc(i)$ deterministic slot count for node with index i i index of the response TXOP (0, 1, 2, etc.)

rts length in slots of RTS+SIFS (rounded up to next integer)
The backoff timer value may also be set to a larger value than the value determined according to these rules, as long as the larger backoff gets included in the calculation of the backoff for the next node. For example, the backoff timer values may be calculated according to the following equations:

$dsc(0) \geq 0$ $dsc(i) \geq dsc(i-1)+i*rts+1 \quad i>0$

This approach may be used when a safety margin is needed, for example, when inaccurate slot counts are expected (i.e., one node counts more slots than another node during the same time period). The above rule can be used to account for sloppy slot counts, even in the absence of hidden nodes. The value for "rts" may be set to an expected maximum slot count difference in this case.

The following example illustrates this technique, assuming 6 stations (STA0-STA5), each assigned a dsc, dsc(0)-dsc(5). Assuming an RTS transmitted at 6 Mbps OFDM may take 28 us. Assuming SIFS is 16 us, and the slot size is 9 us:

$rts=\text{roundup}((28+16)/9)=5$ slots

Therefore, the deterministic backoff for each node may be calculated as:

$dsc(0)=0$ $dsc(i)=dsc(i-1)+i*5+1 \quad i>0$ which results in:

$dsc(0)=0$ $dsc(1)=0+5+1=6$ $dsc(2)=6+10+1=17$ $dsc(3)=17+15+1=33$ $dsc(4)=33+20+1=54$, and $dsc(5)=54+25+1=80$.

Figure 10:
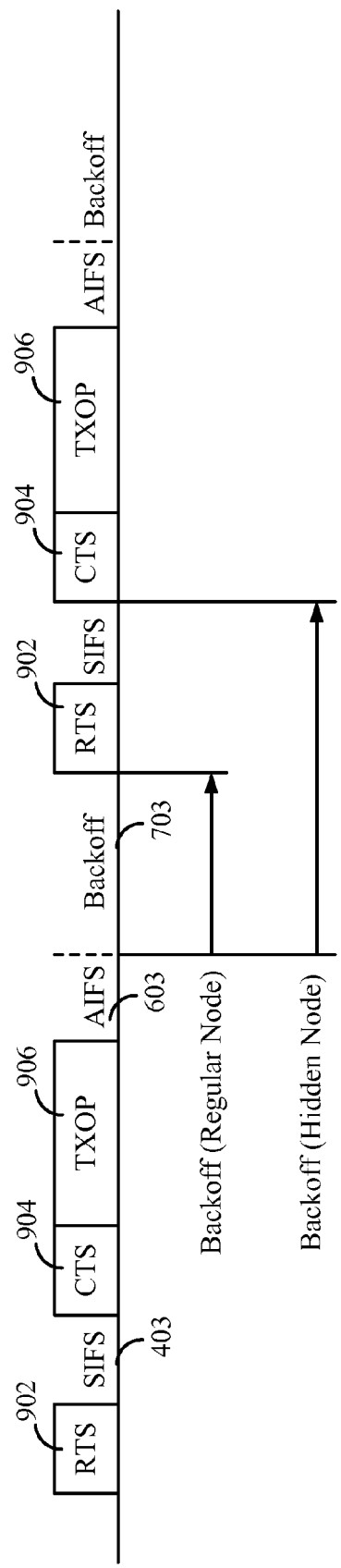
FIG. 10 illustrates an example diagram of response TXOPs with a possibly hidden RTS.

FIG. 10 illustrates an example diagram of response TXOPs with a possibly hidden RTS. As illustrated, each TXOP 906 may be preceded by an RTS 902. The TXOP 906 is sent after receiving a CTS 904. As illustrated, for a regular (non-hidden) node, a backoff countdown may stop after detecting an RTS 902. However, the RTS 902 is not visible to a hidden node, so backoff countdown continues until the CTS 904 (sent in response to the hidden RTS 908) is detected.

FIGS. 11-14 illustrate example backoff countdown sequences for four example nodes, given different scenarios involving which, if any of the four nodes are hidden. In the figures, the "current" backoff values are indicated in the columns labeled "STAx countdown." These columns indicate when/if backoff countdown occurs during the events shown.

The backoff process illustrated in FIG. 10 assumes the case in which there are no hidden nodes. As illustrated, in this scenario no backoff countdown occurs at any of the nodes during the RTS, because each station can hear each RTS transmitted by the other stations.

The backoff process illustrated in FIG. 11 assumes the case in which STA0 is hidden for the other STAs. In other words, as illustrated, each of STAs 1-3 count down 5 slots during the RTS that is transmitted by STA0 (because they are not able to detect that RTS, which would cause them to stop counting down). In the illustrated example, STA1 counts down from 6 to 1, STA2 from 17 to 12, and STA3 from 33 to 28.

The backoff process illustrated in FIG. 12 assumes the case in which STA1 and STA2 are hidden relative to each other (but not hidden to other nodes). As illustrated, in this case, STA2 continues to count down during the RTS of STA1, while STA3 and STA4 do not. In contrast, the backoff process illustrated in FIG. 13 assumes the case in which STA3 and is hidden relative to all the other nodes. As illustrated, in this case, STA3 counts down during the RTS of each of the preceding stations (STA0, STA1, and STA2).

In either case illustrated in FIGS. 10-13, however, setting the deterministic countdown timer, as noted above, to take into consideration the RTS transmission of preceding stations, the hidden node collision potential may be removed.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of X and Y" is meant to be inclusive of the combination of X and Y. In other words, "at least one of X and Y" includes X, Y, and the combination of X and Y.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, operations 700 and 800 illustrated in FIGS. 7 and 8 may be performed by corresponding means 700A and 800A illustrated in FIGS. 7A and 8A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

The invention claimed is:
1. A method for wireless communications, comprising:
  receiving, on a contention access (CA) channel, a transmission containing downlink data, a block acknowledgment request (BAR), and transmit opportunity (TXOP) scheduling information, wherein the TXOP scheduling information comprises a deterministic slot count;
  determining a TXOP based, at least in part, on the scheduling information and one or more monitored clear channel assessment (CCA) busy events; and
  sending a transmission during the determined TXOP.
2. The method of claim 1, wherein the one or more monitored CCA busy events comprise an end of a TXOP of one of a plurality of wireless nodes.
3. The method of claim 1, wherein the scheduling information comprises a backoff value for each of a plurality of wireless nodes, the backoff value for each wireless node indicating when the wireless node should send a transmission after a CCA busy event.
4. The method of claim 3, further comprising:
  adjusting a backoff value after a CCA busy event.
5. The method of claim 4, wherein the adjusting comprises:
  adjusting the backoff value based, at least in part, on a node index and a number of the CCA busy event.
6. An apparatus for wireless communications, comprising:
  a receiver configured to receive, on a contention access (CA) channel, a transmission containing downlink data, a block acknowledgment request (BAR), and transmit opportunity (TXOP) scheduling information, wherein the TXOP scheduling information comprises a deterministic slot count;
  a scheduler configured to determine a TXOP based, at least in part, on the scheduling information and one or more monitored clear channel assessment (CCA) busy events; and
  a transmitter configured to send a transmission during the determined TXOP.
7. The apparatus of claim 6, wherein the one or more monitored CCA busy events comprise an end of a TXOP of one of a plurality of wireless nodes.
8. The apparatus of claim 6, wherein the scheduling information comprises a backoff value for each of a plurality of wireless nodes, the backoff value for each wireless node indicating when the wireless node should send a transmission after a CCA busy event.
9. The apparatus of claim 8, further comprising:
  adjusting a backoff value after a CCA busy event.
10. The apparatus of claim 9, wherein adjusting a backoff value after a CCA busy event comprises:
  adjusting the backoff value based, at least in part, on a node index and a number of the CCA busy event.
11. An apparatus, comprising:
  means for receiving, on a contention access (CA) channel, a transmission containing downlink data, a block acknowledgment request (BAR), and transmit opportunity (TXOP) scheduling information, wherein the TXOP scheduling information comprises a deterministic slot count;
  means for determining a TXOP based, at least in part, on the scheduling information and one or more monitored clear channel assessment (CCA) busy events; and
  means for sending a transmission during the determined TXOP.
12. The apparatus of claim 11, wherein the one or more monitored CCA busy events comprise an end of a TXOP of one of a plurality of wireless nodes.
13. The apparatus of claim 11, wherein the scheduling information comprises a backoff value for each of a plurality of wireless nodes, the backoff value for each wireless node indicating when the wireless node should send a transmission after a CCA busy event.
14. The apparatus of claim 13, further comprising:
  means for adjusting a backoff value after a CCA busy event.
15. The apparatus of claim 14, wherein the means for adjusting is configured to adjust the backoff value based, at least in part, on a node index and a number of the CCA busy event.
16. A computer-program product for wireless communications, comprising a non-transitory computer-readable medium comprising instructions executable by an apparatus to:
  receive, on a contention access (CA) channel, a transmission containing downlink data, a block acknowledgment request (BAR), and transmit opportunity (TXOP) scheduling information, wherein the TXOP scheduling information comprises a deterministic slot count;
  determine a TXOP based, at least in part, on the scheduling information and one or more monitored clear channel assessment (CCA) busy events; and
  send a transmission during the determined TXOP.
17. A wireless station, comprising:
  at least one antenna;
  a receiver configured to receive, via the at least one antenna, on a contention access (CA) channel, a transmission containing downlink data, a block acknowledgment request (BAR), and transmit opportunity (TXOP) scheduling information, wherein the TXOP scheduling information comprises a deterministic slot count;
  a scheduler configured to determine a TXOP based, at least in part, on the scheduling information and one or more monitored clear channel assessment (CCA) busy events; and
  a transmitter configured to send, via the at least one antenna, a transmission during the determined TXOP.
18. A method for wireless communications, comprising:
  transmitting, on a contention access (CA) channel, one or more transmissions, each transmission containing downlink data, a block acknowledgment request (BAR), and transmit opportunity (TXOP) scheduling information, wherein the TXOP scheduling information comprises a deterministic slot count; and
  receiving transmissions from a plurality of wireless nodes during TXOPs determined, at least in part, based on the scheduling information and one or more monitored clear channel assessment (CCA) busy events.
19. The method of claim 18, wherein the one or more monitored CCA busy events comprise an end of a TXOP of one of the plurality of wireless nodes.
20. The method of claim 18, wherein the scheduling information comprises a backoff value for each wireless node, the backoff value for each wireless node indicating when the wireless node should send a transmission after a CCA busy event.
21. An apparatus for wireless communications, comprising:
  a transmitter configured to transmit, on a contention access (CA) channel, one or more transmissions, each transmission containing downlink data, a block acknowledgment request (BAR), and transmit opportunity (TXOP)

scheduling information, wherein the TXOP scheduling information comprises a deterministic slot count; and a receiver configured to receive transmissions from a plurality of wireless nodes during TXOPs determined, at least in part, based on the scheduling information and one or more monitored clear channel assessment (CCA) busy events.

22. The apparatus of claim 21, wherein the one or more monitored CCA busy events comprise an end of a TXOP of one of the plurality of wireless nodes.

23. The apparatus of claim 21, wherein the scheduling information comprises a backoff value for each wireless node, the backoff value for each wireless node indicating when the wireless node should send a transmission after a CCA busy event.

24. An apparatus for wireless communications, comprising:

means for transmitting, on a contention access (CA) channel, one or more transmissions, each transmission containing downlink data, a block acknowledgment request (BAR), and transmit opportunity (TXOP) scheduling information, wherein the TXOP scheduling information comprises a deterministic slot count; and means for receiving transmissions from a plurality of wireless nodes during TXOPs determined, at least in part, based on the scheduling information and one or more monitored clear channel assessment (CCA) busy events.

25. The apparatus of claim 24, wherein the one or more monitored CCA busy events comprise an end of a TXOP of one of the plurality of wireless nodes.

26. The apparatus of claim 24, wherein the scheduling information comprises a backoff value for each wireless node, each backoff value indicating when a corresponding wireless node should send a transmission after a CCA busy event.

27. A computer-program product for wireless communications, comprising a non-transitory computer-readable medium comprising instructions executable by an apparatus to:

transmit, on a contention access (CA) channel, one or more transmissions, each transmission containing downlink data, a block acknowledgment request (BAR), and transmit opportunity (TXOP) scheduling information, wherein the TXOP scheduling information comprises a deterministic slot count; and receive transmissions from a plurality of wireless nodes during TXOPs determined, at least in part, based on the scheduling information and one or more monitored clear channel assessment (CCA) busy events.

28. An access point, comprising:

at least one antenna;

a transmitter configured to transmit, via the at least one antenna, on a contention access (CA) channel, one or more transmissions, each transmission containing downlink data, a block acknowledgment request (BAR), and transmit opportunity (TXOP) scheduling information, wherein the TXOP scheduling information comprises a deterministic slot count; and a receiver configured to receive transmissions from a plurality of wireless nodes during TXOPs determined, at least in part, based on the scheduling information and one or more monitored clear channel assessment (CCA) busy events.

* * * * *